(12) United States Patent
Jalal et al.

(10) Patent No.: US 8,935,485 B2
(45) Date of Patent: Jan. 13, 2015

(54) SNOOP FILTER AND NON-INCLUSIVE SHARED CACHE MEMORY

(75) Inventors: Jamshed Jalal, Austin, TX (US); Brett Stanley Feero, Austin, TX (US); Mark David Werkheiser, Austin, TX (US); Michael Alan Filippo, Driftwood, TX (US)

(73) Assignee: ARM Limited, Cambridge (GB)

( * ) Notice: Subject to any disclaimer, the term of this patent is extended or adjusted under 35 U.S.C. 154(b) by 750 days.

(21) Appl. No.: 13/137,359

(22) Filed: Aug. 8, 2011

(65) Prior Publication Data

US 2013/0042078 A1 Feb. 14, 2013

(51) Int. Cl.
*G06F 12/00* (2006.01)
*G06F 12/08* (2006.01)

(52) U.S. Cl.
CPC ............ *G06F 12/08* (2013.01); *G06F 12/0815* (2013.01); *G06F 12/0828* (2013.01); *G06F 12/084* (2013.01); *G06F 12/0846* (2013.01)
USPC ........... 711/147; 711/100; 711/117; 711/130; 711/154

(58) Field of Classification Search
CPC ..... G06F 12/08; G06F 12/081; G06F 12/084; G06F 12/0897
USPC .................. 711/100, 117, 118, 130, 147, 154
See application file for complete search history.

(56) References Cited

U.S. PATENT DOCUMENTS

| | | | |
|---|---|---|---|
| 5,136,700 | A | 8/1992 | Thacker |
| 5,404,489 | A | 4/1995 | Woods et al. |
| 5,457,683 | A | 10/1995 | Robins |
| 5,524,212 | A | 6/1996 | Somani et al. |

(Continued)

FOREIGN PATENT DOCUMENTS

JP 10-222423 8/1998

OTHER PUBLICATIONS

S.T. Jhang et al, "A New Write-Invalidate Snooping Cache Coherence Protocol for Split Transaction Bus-Based Multiprocessor Systems" *IEEE TENCON'93*, 1993 pp. 229-232.

(Continued)

*Primary Examiner* — Tuan Thai
(74) *Attorney, Agent, or Firm* — Nixon & Vanderhye P.C.

(57) ABSTRACT

A data processing apparatus 2 includes a plurality of transaction sources 8, 10 each including a local cache memory. A shared cache memory 16 stores cache lines of data together with shared cache tag values. Snoop filter circuitry 14 stores snoop filter tag values tracking which cache lines of data are stored within the local cache memories. When a transaction is received for a target cache line of data, then the snoop filter circuitry 14 compares the target tag value with the snoop filter tag values and the shared cache circuitry 16 compares the target tag value with the shared cache tag values. The shared cache circuitry 16 operates in a default non-inclusive mode. The shared cache memory 16 and the snoop filter 14 accordingly behave non-inclusively in respect of data storage within the shared cache memory 16, but inclusively in respect of tag storage given the combined action of the snoop filter tag values and the shared cache tag values. Tag maintenance operations moving tag values between the snoop filter circuitry 14 and the shared cache memory 16 are performed atomically. The snoop filter circuitry 14 and the shared cache memory 16 compare operations are performed using interlocked parallel pipelines.

21 Claims, 4 Drawing Sheets

(56) References Cited

U.S. PATENT DOCUMENTS

| | | | |
|---|---|---|---|
| 5,551,001 A | 8/1996 | Cohen et al. | |
| 5,551,005 A | 8/1996 | Sarangdhar et al. | |
| 5,581,725 A | 12/1996 | Nakayama | |
| 5,581,729 A | 12/1996 | Nishtala et al. | |
| 5,598,550 A | 1/1997 | Shen et al. | |
| 5,813,034 A | 9/1998 | Castle et al. | |
| 5,829,034 A | 10/1998 | Hagersten et al. | |
| 5,852,716 A | 12/1998 | Hagersten et al. | |
| 5,860,109 A | 1/1999 | Hagersten et al. | |
| 5,887,138 A | 3/1999 | Hagersten et al. | |
| 6,052,760 A | 4/2000 | Bauman et al. | |
| 6,061,766 A | 5/2000 | Lynch et al. | |
| 6,065,077 A | 5/2000 | Fu | |
| 6,073,212 A | 6/2000 | Hayes et al. | |
| 6,076,147 A | 6/2000 | Lynch et al. | |
| 6,108,752 A | 8/2000 | VanDoren et al. | |
| 6,138,218 A | 10/2000 | Arimilli et al. | |
| 6,272,602 B1 | 8/2001 | Singhal et al. | |
| 6,275,909 B1 | 8/2001 | Arimilli et al. | |
| 6,292,872 B1 | 9/2001 | Arimilli et al. | |
| 6,314,489 B1 * | 11/2001 | Nichols et al. | 711/1 |
| 6,321,305 B1 * | 11/2001 | Arimilli et al. | 711/143 |
| 6,338,124 B1 | 1/2002 | Arimilli et al. | |
| 6,343,347 B1 | 1/2002 | Arimilli et al. | |
| 6,351,791 B1 | 2/2002 | Freerksen et al. | |
| 6,502,171 B1 | 12/2002 | Arimilli et al. | |
| 6,848,003 B1 | 1/2005 | Arimilli et al. | |
| 8,078,831 B2 * | 12/2011 | Wang et al. | 712/10 |
| 8,209,489 B2 * | 6/2012 | Guthrie et al. | 711/137 |
| 8,234,451 B1 * | 7/2012 | Agarwal et al. | 711/122 |
| 2001/0014932 A1 | 8/2001 | Suganuma | |
| 2001/0021963 A1 | 9/2001 | Cypher | |
| 2002/0010836 A1 | 1/2002 | Barroso et al. | |
| 2002/0013886 A1 | 1/2002 | Higuchi et al. | |
| 2002/0073281 A1 | 6/2002 | Gaither | |
| 2002/0083243 A1 | 6/2002 | Van Huben et al. | |
| 2002/0154639 A1 | 10/2002 | Calvert et al. | |
| 2003/0005237 A1 | 1/2003 | Dhong et al. | |
| 2003/0009621 A1 | 1/2003 | Gruner et al. | |
| 2003/0014592 A1 | 1/2003 | Arimilli et al. | |
| 2003/0014593 A1 | 1/2003 | Arimilli et al. | |
| 2003/0023814 A1 | 1/2003 | Barroso et al. | |
| 2003/0046356 A1 | 3/2003 | Alvarez, II et al. | |
| 2003/0131200 A1 | 7/2003 | Berg et al. | |
| 2004/0030834 A1 | 2/2004 | Sharma | |
| 2004/0133748 A1 | 7/2004 | Yang | |
| 2004/0133749 A1 | 7/2004 | Yang | |
| 2004/0199727 A1 | 10/2004 | Narad | |
| 2004/0268055 A1 | 12/2004 | Landin et al. | |
| 2005/0021913 A1 | 1/2005 | Heller, Jr. | |
| 2005/0216666 A1 | 9/2005 | Sih et al. | |
| 2005/0240736 A1 | 10/2005 | Shaw | |
| 2006/0179247 A1 | 8/2006 | Fields, Jr. et al. | |
| 2006/0224835 A1 | 10/2006 | Blumrich et al. | |
| 2006/0224839 A1 | 10/2006 | Blumrich et al. | |
| 2007/0156972 A1 | 7/2007 | Uehara et al. | |
| 2007/0180196 A1 | 8/2007 | Guthrie et al. | |
| 2007/0186056 A1 | 8/2007 | Saha et al. | |
| 2007/0204110 A1 | 8/2007 | Guthrie et al. | |
| 2007/0226426 A1 | 9/2007 | Clark et al. | |
| 2007/0226427 A1 | 9/2007 | Guthrie et al. | |
| 2007/0255907 A1 | 11/2007 | Zeffer et al. | |
| 2008/0086601 A1 | 4/2008 | Gaither et al. | |
| 2008/0133843 A1 | 6/2008 | Wadhawan et al. | |
| 2008/0209133 A1 | 8/2008 | Ozer et al. | |
| 2008/0235452 A1 | 9/2008 | Kornegay et al. | |
| 2008/0270708 A1 | 10/2008 | Warner et al. | |
| 2008/0288725 A1 | 11/2008 | Moyer et al. | |
| 2008/0313411 A1 | 12/2008 | Sugizaki | |
| 2009/0024797 A1 | 1/2009 | Shen et al. | |
| 2009/0077329 A1 | 3/2009 | Wood et al. | |
| 2009/0172211 A1 | 7/2009 | Perry et al. | |
| 2009/0172295 A1 | 7/2009 | Steiner et al. | |
| 2009/0300289 A1 | 12/2009 | Kurts et al. | |
| 2010/0042787 A1 | 2/2010 | Auernhammer et al. | |
| 2010/0235576 A1 | 9/2010 | Guthrie et al. | |
| 2011/0055277 A1 | 3/2011 | Resch | |
| 2011/0191543 A1 | 8/2011 | Craske et al. | |
| 2011/0252202 A1 | 10/2011 | Heine et al. | |

OTHER PUBLICATIONS

M. Azimi et al, "Design and Analysis of a Hierarchical Snooping Cache Coherence System" Proceedings, Twenty-Sixth Annual Allerton Conference on Communication, Control, and Computing, Sep. 1988, pp. 109-118.

S. Subha, "A Two-Type Data Cache Model" IEEE International Conference on Electro/Information Technology, Jun. 2009, pp. 476-481.

M. Blumrich et al, "Exploring the Architecture of a Stream Register-Based Snoop Filter" Transactions on High-Performance Embedded Architectures and Compilers III, Lecture Notes in Computer Science, 2011, vol. 6590/2011, pp. 93-114.

A. Dash et al, "Energy-Efficient Cache Coherence for Embedded Multi-Processor Systems through Application-Driven Snoop Filtering" Proceedings of the 9$^{th}$ Euromicro Conference on Digital System Design (DSD'06), pp. 79-82.

A. Patel et al, "Energy Efficient MESI Cache Coherence with Pro-Active Snoop Filtering for Multicore Microprocessors" ISLPED'08, Aug. 2008, pp. 247-252.

UK Search Report dated Oct. 5, 2012 in GB 1210130.9.

* cited by examiner

SNOOP FILTER AND NON-INCLUSIVE SHARED CACHE MEMORY

BACKGROUND OF THE INVENTION

1. Field of the Invention

This invention relates to the field of data processing systems. More particularly, this invention relates to cache memory hierarchies and snoop filtering circuitry for supporting coherence within such cache memory hierarchies.

2. Description of the Prior Art

It is known to provide data processing systems with cache memory hierarchies. In a non-inclusive mode of operation the cache memory hierarchy operates such that a single copy of a cache line of data is held. This single line of cache data may be held at, for example, the level one (L1), the level two (L2) or the level three (L3), but not at more than one level or in more than one cache within a level. Such non-inclusive operation makes efficient use of storage capacity within the cache hierarchy, but suffers from the disadvantage of slower access to a cache line of data when this is not stored at a location close to the transaction source requesting access to that cache line of data.

Another mode of operation is the inclusive mode. In the inclusive mode of operation a cache line of data may be stored in multiple levels of the cache hierarchy and in multiple caches within a level of the cache hierarchy. This type of operation may provide more rapid access to a given line of cache data by a requesting transaction source, but suffers from the disadvantage of less efficient usage of the storage resources of the cache hierarchy.

It is known to provide snoop filter circuitry that serves to store snoop tag values within an inclusive mode of operation that identify which cache memories are storing copies of a given cache line of data such that snoop requests and accesses may be directed to those local cache memories that are storing the cache line of data targeted. A disadvantage of snoop filter circuitry is the resource consumed in terms of gate count, power, area and the like.

SUMMARY OF THE INVENTION

Viewed from one aspect the present invention provides apparatus for processing data comprising: a plurality of transaction sources, each of said plurality of transaction sources having a local cache memory; a shared cache memory coupled to said plurality of transaction sources and configured to operate in a non-inclusive mode, said shared cache memory storing shared cache tag values tracking which cache lines of data are stored in said shared cache memory; and snoop filter circuitry configured to store snoop filter tag values for tracking which cache lines of data are stored in said local cache memories; wherein in response to a transaction request to a target cache line of data having a target tag value:

(i) said shared cache memory is configured to compare said target tag value with said shared cache tag values to detect if said target cache line of data is stored in said shared cache memory; and (ii) said snoop filter circuitry is configured to compare said target tag value with said snoop filter tag values to detect if said target cache line of data is stored in any of said local cache memories.

The present technique provides a data processing apparatus which has a shared cache memory, such as a level 3 cache memory, which operates in a non-inclusive mode. It also has snoop filtering circuitry which stores snoop filter tag values tracking which cache lines of data are stored in the local memories. The snoop filter circuitry need not store snoop filter tag values (although in some cases discussed below it does) for cache lines of data which are held within the shared cache memory as the shared cache tag values may instead be used to identify and locate a target cache line of data to be subject to a transaction request. This saves space within the snoop filter circuitry. The present technique may be considered to provide a system which operates non-inclusively with respect to its storage of data values (i.e. shared cache memory non-inclusively stores cache lines of data) whilst providing tag storage on an inclusive basis (i.e. the tags of all of the cache lines of data present within the shared cache memory and the local cache memories are stored within the shared cache memory and the snoop filter circuitry respectively). This helps to reduce the volume of snoop traffic required as the location and presence of cache lines of data may be determined from the snoop filter circuitry and the shared cache memory.

It is possible that the snoop filter circuitry may simply store snoop filter tag values indicating that a cache line of data is present within one of the local cache memories and require a broadcast to be made to all of those local cache memories. However, some embodiments may store transaction source identifying data within the snoop filter circuitry, this transaction source identifying data identifying which cache lines of data are stored in which of the cache memories. In this way it is more likely that speculative snoops can be avoided as it may be determined from the snoop filter circuitry alone what lines of cache data are stored and in which local cache memories.

The transaction source identifying data may serve to identify only a single local cache memory as this will preserve storage capacity and may be sufficient in a large number of operational circumstances. In other embodiments the transaction source identifying data may identify a proper subset of the transaction sources with a number chosen to balance between the storage space consumed and the efficiency gains achieved. An individual item of transaction source identifying data may also be non-precise and identify a range of transaction sources, e.g. all even numbered transaction source or all transactions sources with numbers within a certain range.

The configuration of the snoop filter circuitry may be such that it is constrained to be strictly inclusive in the sense that it must store a snoop filter tag value for each cache line of data that is stored within a local cache memory. However, it is not necessary that every stored snoop filter tag value need have a corresponding cache line of data stored within a local cache memory as it is possible that cache lines of data may be removed from a local cache memory without this being tracked in the snoop filter circuitry in some uncommon cases.

The snoop filter circuitry and the shared cache memory both compare a target tag value with their stored tag values. If either of these produces a hit, then the transaction request is serviced by the appropriate one of the local cache memories having the matching snoop filtered tag value or the shared cache memory having the matching shared cache tag value.

In some situations the default non-inclusive behaviour of the shared cache memory may be overridden selectively on a cache line by cache line basis such that is possible that a hit could occur in both the snoop filter circuitry and the shared cache memory with both of these then servicing the transaction request.

Operational speed may be increased and control complexity decreased if the shared cache memory and the snoop filter circuitry are configured to perform their compare operations in parallel. In some embodiments the shared cache memory and the snoop filter circuitry may be configured to operate as interlocked pipelines when performing accesses in parallel.

If a hit occurs in neither the shared cache memory nor the snoop filter circuitry, then a transaction to the target cache line of data may be initiated to a main memory. The returned target cache line of data will normally be stored in one of the local cache memories corresponding to the source of the transaction and will not be stored in the shared cache memory (i.e. consistent with the default non-inclusive behaviour of the shared cache memory). If that target cache line of data is subsequently evicted from the local cache memory, then it may be stored within the shared cache memory at that later time.

Control complexity is advantageously reduced when the shared cache memory and the snoop filter circuitry are configured to atomically change a tag value between being stored as a snoop filter tag value in the snoop filter circuitry and being stored as a shared cache tag value in the shared cache memory so as to follow a change in storage location for corresponding cache line of data. Such atomic behaviour has the result that when a change is made then this will be fully completed as a single operation at least as far as the external visibility of any changes made. Thus, a subsequent transaction will not be able to observe a partially completed change in the storage location of a tag value as this could produce erroneous or unpredictable behaviour requiring considerable control complexity to manage or prevent.

Examples of the atomic changes to be the storage location of a tag value are when a cache line is evicted from one of the local cache memories to the shared cache memory or when a cache line of data is recalled from the shared cache memory to one of the local cache memories.

As previously mentioned the shared cache memory may be configured to be controlled to selectively store one or more cache lines of data in an inclusive mode. An example of operations which can cause this switch to inclusive mode storage for a cache line of data are a response to a transaction request having one of one or more predetermined types. As an example, a transaction with a type such that it will read a cache line of data to a local cache memory and not subsequently modify that cache line of data stored in the local cache memory may be such as to trigger/permit inclusive storage of that cache line of data.

In some embodiments the shared cache memory and the snoop circuitry may be configured to store unique status data for each cache line of data associated with one of a plurality of transaction sources with this unique status data indicating whether that cache line of data is stored in a local cache memory of any other of the plurality of transaction sources. Thus, the unique status data indicates whether a cache line of data is uniquely stored on behalf of a single transaction source or is non-uniquely stored on behalf of multiple transaction sources.

In some embodiments the shared cache memory and the snoop filter circuitry may be configured to respond to receipt of a non-modifying read transaction from a given transaction source that hits a cache line of data stored in the shared cache memory by a different transaction source by returning the cache line of data to the given transaction source for storing in a local cache memory of the given transaction source, leaving the cache line of data stored in the shared cache memory and setting the unique status data for the cache line of data in both the shared cache memory and the snoop filter circuitry to indicate that the cache land of data stored associated with a plurality of transaction sources. In this way, the shared cache memory is switched to operating in an inclusive mode in respect of at least the cache line of data for which the non-modifying read transaction was received.

In other embodiments (including in combination with the above) the shared cache memory and the snoop filter circuitry may be configured to respond to receipt of a non-modifying read transaction from a given transaction source that missed in the shared cache memory and hits a cache line of data stored in a local cache memory of a different transaction source by returning the cache line of data to the given transaction source for storing in a local cache memory of the given transaction source, leaving the cache line of data stored in the local cache memory of the different transaction source, storing the cache line of data in the shared cache memory and setting the unique status data in both the shared cache memory and the snoop filter circuitry for the cache line for data to indicate that the cache line data is stored associated with a plurality of transaction sources. Again this switches operation to an inclusive mode for the cache line of data concerned.

When a cache line of data is fetched from a memory in response to a transaction request from one of the plurality of transaction sources, the cache line of data will be stored in the local cache memory of one of the plurality sources and a corresponding snoop filter tag value will be stored within the snoop filter circuitry. If a transaction source identifying data value is also by the snoop filter circuitry, then this may be written at the same time.

It will be appreciated that the plurality of transaction sources can have a variety of different forms. In one form these include one or more processor cores. The local cache memories may similarly have a variety of different forms such as including an L1 cache memory and an L2 cache memory.

The plurality of transaction sources may be conveniently connected together via a ring-based interconnect. Such a ring-based interconnect is efficiently scaled as more transaction sources or more shared cache memories are added to the system.

Viewed from another aspect the present invention provides apparatus for processing data comprising: a plurality of transaction source means for generating transactions, each of said plurality of transaction source means having local cache memory means for storing data; shared cache memory means for storing data, said shared cache memory means being coupled to said plurality of transaction source means and configured to operate in a non-inclusive mode, said shared cache memory means storing shared cache tag values tracking which cache lines of data are stored in said shared cache memory means; and snoop filter means for storing snoop filter tag values for tracking which cache lines of data are stored in said local cache memory means; wherein in response to a transaction request to a target cache line of data having a target tag value:

(i) said shared cache memory means is configured to compare said target tag value with said shared cache tag values to detect if said target cache line of data is stored in said shared cache memory means; and (ii) said snoop filter means is configured to compare said target tag value with said snoop filter tag values to detect if said target cache line of data is stored in any of said local cache memory means.

Viewed from a further aspect the present invention provides a method of processing data comprising the steps of: generating transactions with a plurality of transaction sources; storing respective data in a local cache memory of each of said plurality of transaction sources; storing data in a shared cache memory coupled to said plurality of transaction sources; operating said shared cache memory in a non-inclusive mode; storing in said shared cache memory shared cache tag values tracking which cache lines of data are stored in said shared cache memory means; storing in snoop filter circuitry snoop filter tag values for tracking which cache lines of data are stored in said local cache memory means; and in response to a transaction request to a target cache line of data having a target tag value:

(i) comparing said target tag value with said shared cache tag values to detect if said target cache line of data is stored in said shared cache memory; and (ii) comparing said target tag value with said snoop filter tag values to detect if said target cache line of data is stored in any of said local cache memories.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
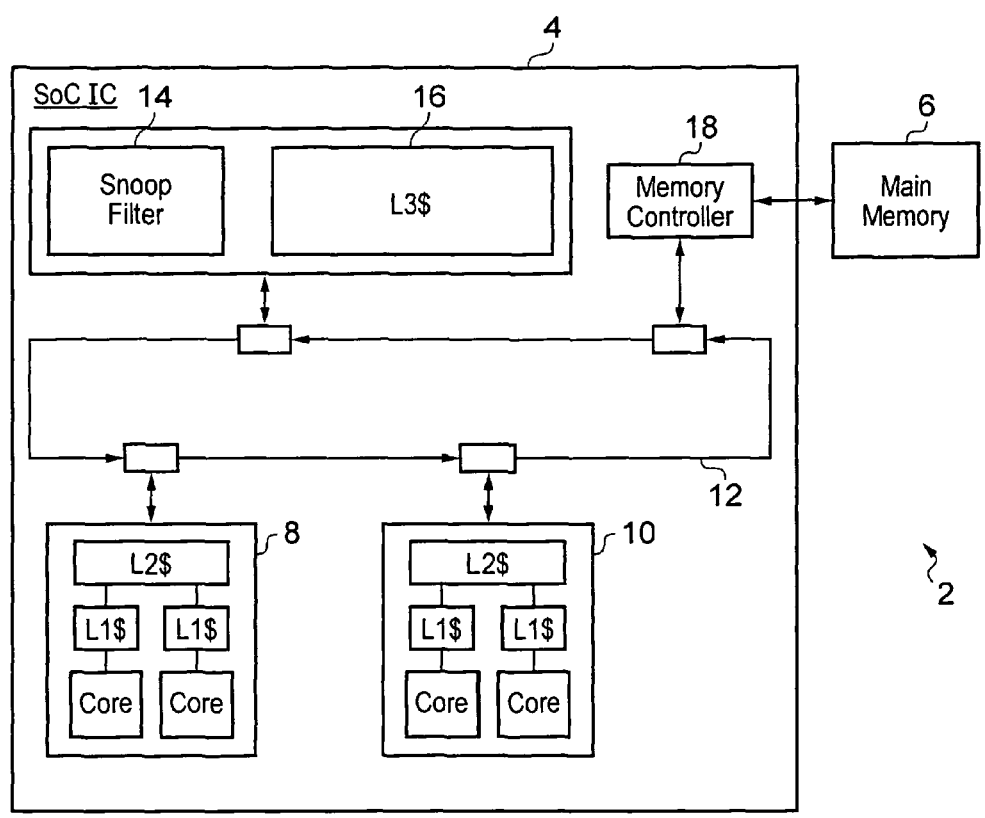
FIG. 1 schematically illustrates a data processing apparatus including a plurality of transaction sources, each including a local cache memory, a shared cache memory and snoop filter circuitry.

FIG. 1 schematically illustrates a data processing apparatus comprising a system-chip 2 on integrated circuit 4 coupled to a main memory 6. The system on-on-chip integrated circuit 4 includes a plurality of transaction sources 8, 10 each comprising a L2 cache memory, two L1 cache memories and two processor cores. The L2 cache memory and the two L1 cache memories within each transaction source 8, 10 can collectively be considered as a local cache memory for that separate transaction source 8, 10. A ring based interconnect 12 couples the transaction sources 8, 10 to snoop filter circuitry 14 and a shared cache memory 16 in the form of an L3 cache. A memory controller 18 is also coupled to the ring-based interconnect 12 and permits access to data within the main memory 6 if that data is not present within the cache hierarchy formed of the shared cache memory 16 and the local cache memories within the transaction sources 8, 10.

When a processor core issues a transaction seeking to access a cache line of data, a determination is made as to whether or not this cache line data is stored within the local cache memory associated with that processor core. If there is a miss in the local cache memory, then a transaction is sent via the ring-based interconnect 12 to the snoop filter circuitry 14 and the shared cache memory 16. The snoop filter circuitry 14 and the shared cache memory 16 perform a parallel pipeline-interlocked tag look up of the target tag value associated with the transaction sent on the ring-based interconnect 12. This lookup comprises comparing the target tag value with snoop filter tag values stored within the snoop filter circuitry 14 and with shared cache tag values stored within the shared cache memory 16.

If a hit occurs within the shared cache memory 16, then the transaction is serviced by the shared cache memory 16. If a hit occurs within the snoop filter circuitry 14, then the snoop filter circuitry returns signals confirming that the target cache line of data is stored within one of the local cache memories within the system-on-chip integrated circuit 4 and identifying this local cache memory (using transaction source identifying data stored in association With the snoop filter tag value). If misses occur in both the snoop filter circuitry 14 and the shared cache memory 16, then the memory controller 18 initiates an off-chip memory access to the main memory 6 in respect of the target cache line of data.

The returned target cache line of data from the main memory 6 is stored back in to the local cache memory of the transaction source which requested that target cache line of data and a corresponding snoop filter tag entry is written in to the snoop filter circuitry 14 to identify via this snoop filter tag values the memory location of the cache line of data stored back in to the local cache memory together with a transaction source identifying data value identifying which transaction source has the local cache memory storing that target cache line of data.

The shared cache memory 16 operates predominantly non-inclusively in that the default behaviour is that a cache line of data will either be stored in the shared cache memory 16 or in one of the local cache memories but not in both. This default non-inclusive behaviour can be overridden in certain circumstances. In particular, the transaction type of the transaction seeking a target cache line of data may be identified and if this matches one or more predetermined types then an inclusive mode of storage in respect of that target line of cache data may be triggered. In particular, if the transaction is a read that will not subsequently modify the cache line of data (a read_clean), then if a hit occurs within the shared cache memory 16, then the target cache line of data may be returned to the transaction source which requested it for storage in the local cache memory of that transaction source whilst remaining stored within the shared cache memory 16. A snoop filter tag value will be written in to the snoop filter circuitry 14 to track the presence of the target cache line of data within the transaction source. Thus, the snoop filter tag value and a shared cache tag value will both be tracking the same cache line of data and will indicate its presence in more than one place.

Another circumstance in which the non-inclusive behaviour may be switched to inclusive behaviour for a given cache line of data is if a read transaction that will not subsequently modify a cache line of data is made and that this misses within the shared cache memory 16, but is indicated by the snoop filter circuitry 14 as hitting with one of the local cache memories, then the target cache line of data will be retrieved from the local cache memory in which it is stored and a copy placed in both the shared cache memory 16 and the local cache memory of the transaction source which requested that target cache line of data. In this circumstance the target cache line of data will end up stored within three different places within the system, i.e. within two local cache memories and within the shared cache memory 16. The switch to inclusive mode behaviour in respect of such cache lines may be tracked by the use of unique status data in the form of a unique/non-unique flag stored in respect of each cache line of data being tracked (and stored flag values within the snoop filter circuitry 14 and the shared cache circuitry 16).

When a cache line is being stored in accordance with a non-inclusive mode of operation, then the unique status data will indicate that only a single copy of this cache line of data is stored. When a cache line of data is being held in an inclusive mode of operation, then the unique status data will indicate this.

Figure 2:
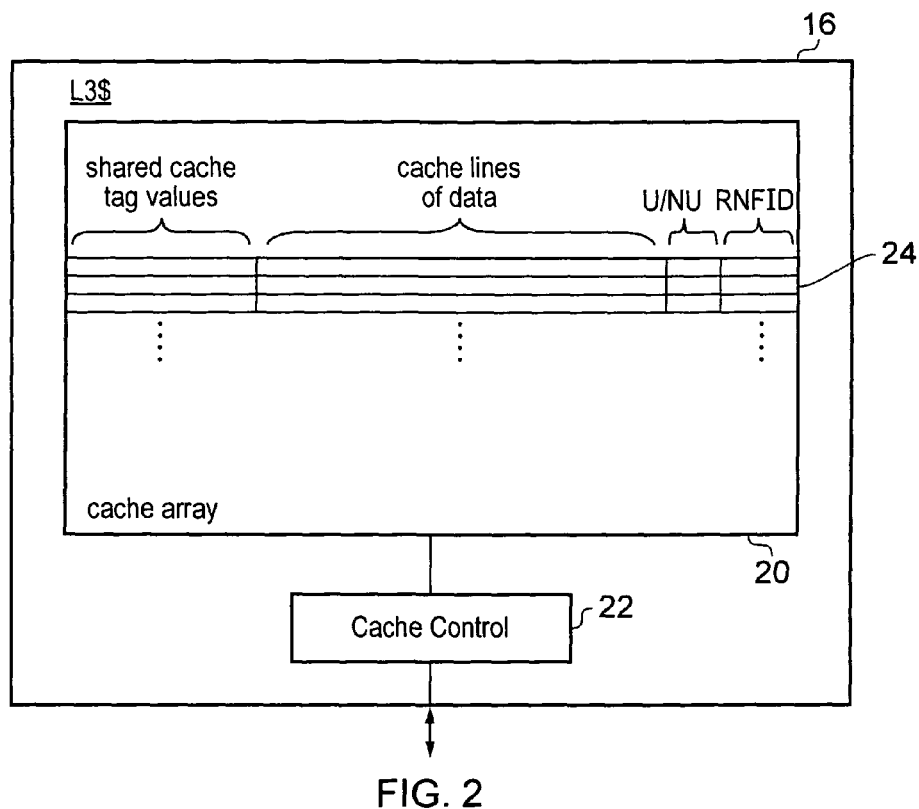
FIG. 2 schematically illustrates a shared cache memory.

FIG. 2 schematically illustrates the shared cache memory 16. This comprises a cache array 20 and a cache controller 22. Each cache line 24 within the cache array 20 stores a shared cache tag value for that cache line 24, the payload of cache line of data as well as associated unique status data (U/NU) and transaction source identifying data (RNFID). The RNFID stored within the shared cache memory 16 indicates which of the transaction sources 8, 10 caused the fill to occur in to the shared cache memory of that cache line of data and accordingly "owns" that cache line of data If the unique status data indicates that the cache line of data is held by more than one local cache memory then the RNFID field becomes invalid since it is only able identify a single transaction source. This has the consequence that a fall back to broadcast snoop requests is then made to identify which local cache memory is storing which cache lines of data when a transaction is received. It is possible in some embodiments that more resource may be dedicated to the transaction source identifying data and multiple transaction sources may be identified, up to a proper subset of the total number of transaction sources present.

Figure 3:
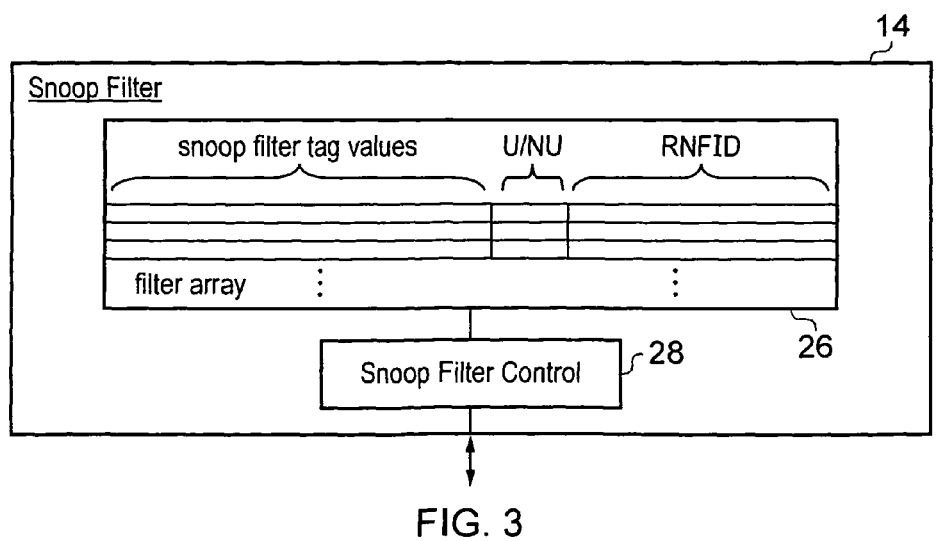
FIG. 3 schematically illustrates snoop filter circuitry.

FIG. 3 schematically illustrates the snoop filter circuitry 14. The snoop filter circuitry 14 includes a filter array 26 storing snoop filter tag values and associated unique status data and transaction source identifying data. A snoop filter controller 28 controls the operation of the snoop filter 14. The snoop filter tag values indicate the tag value (a portion of the memory address from which the cache data values were read within the main memory 6) as well as the unique status data indicating whether or not copies of the cache line data are being held on behalf of multiple local cache memories. The transaction source identifying data (RNFID) identifies the transaction source storing the cache line data corresponding to a snoop filter tag value when a single local cache memory is storing that cache line of data When multiple local cache memories are storing the cache line of data, then the transaction source identifying may not have sufficient capacity to identify these separately and accordingly becomes invalid requiring a broadcast snoop operation to be performed.

Figure 4:
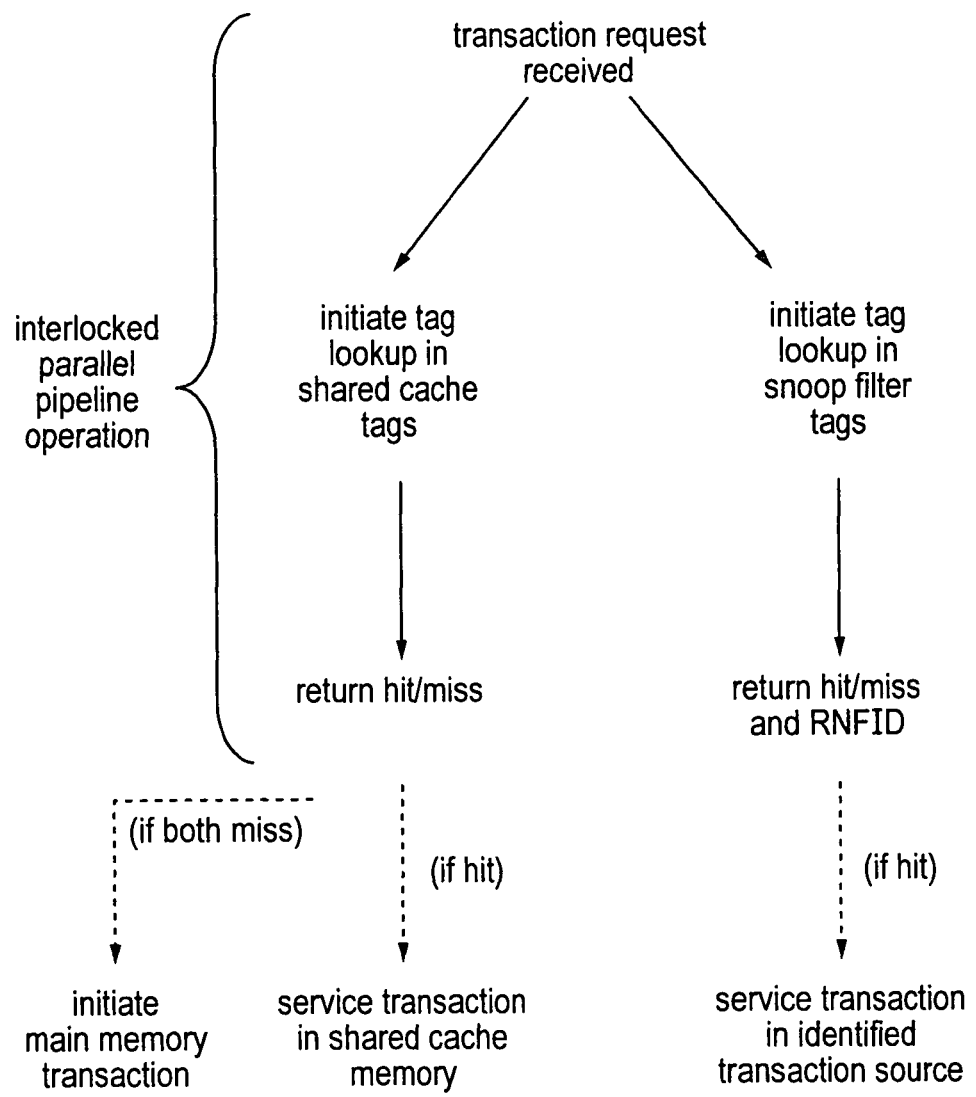
FIG. 4 illustrates the parallel interlocked pipeline operation of the compare operations performed by the snoop filter circuitry and the shared cache memory.

FIG. 4 schematically illustrates the behaviour of the snoop filter circuitry 14 and the shared memory cache 16 in response to a transaction read request received from the ring-based interconnect 12. The snoop filter circuitry 14 and the shared cache memory 16 perform as an interlock parallel pipeline to initiate parallel tag look ups. Both then return hit or miss indications. If a hit is returned by the snoop filter circuitry 14, then a transaction source identifier is returned identifying the local cache memory corresponding to the hit (at least when only a single local cache memory is storing the target cache line of data). If a hit is returned by the snoop filter circuitry 14, then the identified transaction source proceeds to service the transaction. If a hit is returned by the shared cache memory 16, then the shared cache memory proceeds to service the received transaction. If both the snoop filter circuitry 14 and the shared cache memory 16 hit, then both service the received transaction. If misses are returned from both the snoop filter circuitry 14 and the shared cache memory 16, then the transaction is forwarded to the memory controller 18 which initiates a main memory transaction to fetch the target cache line of the data from the main memory 6 and to store it in to the local cache memory of the requesting transaction source as previously discussed.

Figure 5:
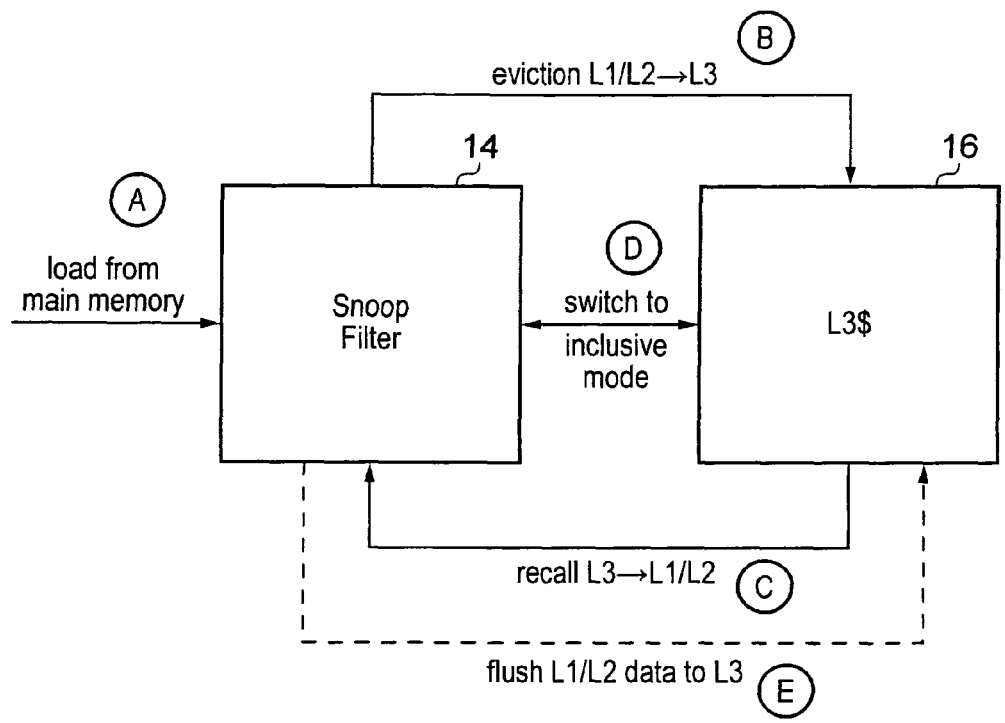
FIG. 5 schematically illustrates atomic tag maintenance in which tag values have their storage location changed between the snoop filter circuitry and the shared cache memory.

FIG. 5 schematically illustrates atomic tag maintenance operations performed upon the snoop filter tag values stored by the snoop filter circuitry 14 and the shared cache tag values stored by the shared cache memory 16. A tag value is first stored as a snoop filter tag value in response to a load from the main memory as action A. The cache line of data is at this stage stored in to the local cache memory of the requesting transaction source and is not stored within the shared cache memory 16. If the local cache memory runs out of space, then it may evict this cache line of data and move it to being stored within the shared cache memory 16. At this time the tag value is moved from being stored as a snoop filter tag value within the snoop filter circuitry 14 to being stored as a shared cache tag value within the shared cache circuitry 16 as indicated by action B. The cache line of data may subsequently be recalled from the shared cache memory 16 back to one of the local cache memories and at this time the tag will be moved from being stored as a shared cache tag value within the shared tag cache memory 16 to being stored as a snoop filter tag value within the snoop filter circuitry 14 as indicated by action C.

As discussed above, it is possible to switch from cache lines being stored in the non-exclusive to being stored in the inclusive mode in certain circumstances. When these circumstances arise action D indicates how a tag value is copied between the snoop filter circuitry 14 and the shared cache memory 16 without being removed from its original location. This results in the same tag value being stored as a snoop filter tag value within the snoop filter circuitry 14 and a shared cache tag value within the shared cache memory 16. This is illustrated by action D.

The system-on-chip integrated circuit 4 may support types of operations such as partial power down in which circumstances it may be desirable to flush the contents of a local cache memory up to the shared cache memory 16. Such cache maintenance operations may be performed and are illustrated by action E in FIG. 5 as requiring all of the snoop filter tag values in respect of a local cache memory being shut down to be moved across to the shared cache memory 16 to accompany the cache lines of data that are being flushed out to the shared cache memory 16.

As previously mentioned the operation of the actions A, B, C, D and E illustrated in FIG. 5 as the tag maintenance operations are performed atomically. This means that if multiple steps are required, then these are treated as a single entity and will always be completed once started (i.e. no intermediate state is visible even if the operation is interrupted).

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus for processing data comprising:
a plurality of transaction sources, each of said plurality of transaction sources having a local cache memory;
a shared cache memory coupled to said plurality of transaction sources and configured to operate in a non-inclusive mode, said shared cache memory storing shared cache tag values tracking which cache lines of data are stored in said shared cache memory; and
snoop filter circuitry configured to store snoop filter tag values for tracking which cache lines of data are stored in said local cache memories; wherein
in response to a transaction request to a target cache line of data having a target tag value:

(i) said shared cache memory is configured to compare said target tag value with said shared cache tag values to detect if said target cache line of data is stored in said shared cache memory; and (ii) said snoop filter circuitry is configured to compare said target tag value with said snoop filter tag values to detect if said target cache line of data is stored in any of said local cache memories, wherein said shared cache memory and said snoop filter circuit are configured to atomically change a tag value between being stored as a snoop filter tag value in said snoop filter circuitry and being stored as a shared cache tag value in said shared cache memory to follow a change in storage location of a corresponding cache line of data between said local cache memories and said shared cache memory.

2. Apparatus as claimed in claim 1, wherein said snoop filter circuitry stores transaction source identifying data identifying which cache lines of data are stored in which of said local cache memories.

3. Apparatus as claimed in claim 1, wherein said snoop filter circuitry is configured such that if a local cache memory is storing a cache line of data, then said snoop filter circuitry must store a corresponding snoop filter tag value.

4. Apparatus as claimed in claim 1, wherein said shared cache memory is configured to service said transaction request if said target tag value matches one of said shared cache tag values.

5. Apparatus as claimed in claim 1, wherein said snoop filter circuitry is configured forward said transaction request for service to any of said local cache memories identified by stored transaction source identifying values for which said target tag value matches one of said snoop filter tag value.

6. Apparatus as claimed in claim 1, wherein said shared cache memory and said snoop filter circuitry are configured to perform said compares in parallel.

7. Apparatus as claimed in claim 6, wherein said shared cache memory and said snoop filter circuitry are configured to operate as interlocked pipelines when performing accesses in parallel.

8. Apparatus as claimed in claim 1, comprising a memory controller configured to perform a transaction to said target cache line of data in a main memory following detection that said shared cache memory is not storing a shared cache tag value matching said target tag value and said snoop filter circuitry is not storing a snoop filter tag value matching said target tag value.

9. Apparatus as claimed in claim 1, wherein said tag value is atomically changed from being stored in said snoop filter circuitry to being stored in said shared cache memory when said corresponding cache line of data is evicted from one of said local cache memories to said shared cache memory.

10. Apparatus as claimed in claim 1, wherein said tag value is atomically changed from being stored in said shared cache memory to being stored in said snoop filter circuitry when said corresponding cache line of data is recalled from said shared cache memory to one of said local cache memories.

11. Apparatus as claimed in claim 1, wherein said shared cache memory is configured to be controlled to selectively store one or more cache lines of data in an inclusive mode.

12. Apparatus as claimed in claim 1, wherein in response to a transaction request having one or more predetermined types to a given cache line of data, switching between a non-inclusive mode and an inclusive mode and said snoop filter circuitry and said shared cache memory correspondingly atomically switching between one or both storing a given tag value for said given cache line of data.

13. Apparatus as claimed in claim 1, wherein said shared cache memory and said snoop filter circuitry are both configured to store unique status data for each cache line of data associated with a given one of said plurality of transaction sources, said unique status data indicating whether said cache line of data is stored in a local cache memory of any other of said plurality of transaction sources.

14. Apparatus as claimed in claim 1, wherein when a cache line of data is fetched from a main memory in response to an transaction request from one of said plurality of transaction sources, said cache line of data is stored in to a local cache memory of said one of said plurality of transaction sources and a corresponding snoop filter tag value is stored in said snoop filter circuitry.

15. Apparatus as claimed in claim 1, wherein said plurality of transaction sources include one or more processor cores.

16. Apparatus as claimed in claim 1, wherein said local cache memories each include a L1 and L2 cache memory.

17. Apparatus as claimed in claim 1, wherein said shared cache memory is a L3 cache memory.

18. Apparatus as claimed in claim 1, wherein said plurality of transaction sources are coupled to ring-based interconnect circuitry.

19. An apparatus for processing data comprising:
a plurality of transaction sources, each of said plurality of transaction sources having a local cache memory;
a shared cache memory coupled to said plurality of transaction sources and configured to operate in a non-inclusive mode, said shared cache memory storing shared cache tag values tracking which cache lines of data are stored in said shared cache memory; and
snoop filter circuitry configured to store snoop filter tag values for tracking which cache lines of data are stored in said local cache memories; wherein
in response to a transaction request to a target cache line of data having a target tag value:
(i) said shared cache memory is configured to compare said target value with said shared cache tag values to detect if said target cache line of data is stored in said shared cache memory; and
(ii) said snoop filter circuitry is configured to compare said target tag value with said snoop filter tag value to detect if said target cache line of data is stored in any of said local cache memories,
wherein in response to a transaction request having one or more predetermined types to a given cache line of data, switching between a non-inclusive mode and an inclusive mode and said snoop filter circuitry and said shared cache memory correspondingly atomically switching between one or both storing a given tag value for said given cache line of data, wherein said one or more predetermined types includes transactions that will read said cache line of data to a local cache memory and not subsequently modify said cache line of data stored in said local cache memory and that trigger a switch from said non-inclusive mode to said inclusive mode.

20. An apparatus for processing data comprising:
a plurality of transaction sources, each of said plurality of transaction sources having a local cache memory;
a shared cache memory coupled to said plurality of transaction sources and configured to operate in a non-inclusive mode, said shared cache memory storing shared cache tag values tracking which cache lines of data are stored in said shared cache memory; and
snoop filter circuitry configured to store snoop filter tag values for tracking which cache lines of data are stored in said local cache memories; wherein in response to a transaction request to a target cache line of data having a target tag value:
(i) said shared cache memory is configured to compare said target tag value with said shared cache tag values to detect if said target cache line of data is stored in said shared cache memory; and
(ii) said snoop filter circuitry is configured to compare said target tag value with said snoop filter tag values to detect if said target cache line of data is stored in any of said local cache memories,
wherein said shared cache memory and said snoop filter circuitry are both configured to store unique status data for each cache line of data associated with a given one of said plurality of transaction sources, said unique status data indicating whether said cache line of data is stored in a local cache memory of any other of said plurality of transaction sources, wherein said shared cache memory and said snoop filter circuitry are configured to respond to receipt of a non-modifying read transaction from a given transaction source that hits a cache line of data stored in said shared cache memory by a different transaction source by returning said cache line of data to said given transaction source for storing in a local cache memory of said given transaction source, leaving said cache line of data stored in said shared cache memory and setting said unique status data for said cache line of data in both said shared cache memory and said snoop filter circuitry to indicate said cache line of data is stored associated with a plurality of transaction sources.

21. An apparatus for processing data comprising:
a plurality of transaction sources, each of said plurality of transaction sources having a local cache memory;
a shared cache memory coupled to said plurality of transaction sources and configured to operate in a non-inclusive mode, said shared cache memory storing shared cache tag values tracking which cache lines of data are stored in said shared cache memory; and
snoop filter circuitry configured to store snoop filter tag values for tracking which cache lines of data are stored in said local cache memories; wherein
in response to a transaction request to a target cache line of data having a target tag value:
(i) said shared cache memory is configured to compare said target tag value with said shared cache tag values to detect if said target cache line of data is stored in said shared cache memory; and
(ii) said snoop filter circuitry is configured to compare said target tag value with said snoop filter tag values to detect if said target cache line of data is stored in any of said local cache memories,
wherein said shared cache memory and said snoop filter circuitry arc both configured to store unique status data for each cache line of data associated with a given one of said plurality of transaction sources, said unique status data indicating whether said cache line of data is stored in a local cache memory of any other of said plurality of transaction sources, wherein said shared cache memory and said snoop filter circuitry are configured to respond to receipt of a non-modifying read transaction from a given transaction source that misses in said shared cache memory and hits a cache line of data stored in a local cache memory of a different transaction source by returning said cache line of data to said given transaction source for storing in a local cache memory of said given transaction source, leaving said cache line of data stored in said local cache memory of said different transaction source, storing said cache line of data in said shared cache memory and setting said unique status data in both said shared cache memory and said snoop filter circuitry for said cache line of data to indicate said cache line of data is stored associated with a plurality of transaction sources.

* * * * *